United States Patent

Kolakowski

[11] 4,052,185
[45] Oct. 4, 1977

[54] METHOD AND APPARATUS FOR PRESS BENDING GLASS SHEETS HAVING RABBETED EDGES

[75] Inventor: Anthony Kolakowski, Crestline, Ohio

[73] Assignee: PPG Industries, Inc., Pittsburgh, Pa.

[21] Appl. No.: 772,893

[22] Filed: Feb. 28, 1977

[51] Int. Cl.$^2$ .................................... C03B 23/02
[52] U.S. Cl. ................................ 65/106; 65/104; 65/273; 65/289
[58] Field of Search .............. 65/104, 106, 273, 275, 65/289

[56] References Cited

U.S. PATENT DOCUMENTS

| 3,144,319 | 8/1964 | Robinson | 65/106 |
| 3,367,764 | 2/1968 | Seymour | 65/273 X |
| 3,837,833 | 9/1974 | Couture et al. | 65/106 X |

Primary Examiner—Arthur D. Kellogg
Attorney, Agent, or Firm—Dennis G. Millman

[57] ABSTRACT

Glass sheets with rabbeted edges may be press bent by utilizing a press member having a slightly compressible marginal filler strip underlying the rabbeted area of the glass.

4 Claims, 2 Drawing Figures

METHOD AND APPARATUS FOR PRESS BENDING GLASS SHEETS HAVING RABBETED EDGES

BACKGROUND OF THE INVENTION

The use of curved transparencies with rabbeted edges is called for in certain specialized glazing applications such as aircraft landing light covers. The rabbeted edges permit the glass sheet to be mounted with its outer surface flush with the outer surface of the aircraft, and the curved shape conforms to the overall streamlined shape of the surrounding portions of the aircraft. The need for such transparencies has heretofore been fulfilled by clear plastic sheet materials, despite their inferior durability, because it was not believed practical to fabricate such a shape from glass. It would be highly desirable, therefore, to be albe to make curved, rabbeted glass sheets to replace plastic in such applications.

A method of grinding rabbeted edges on glass sheets has been disclosed in U.S. applicaton Ser. No. 745,705, filed on Nov. 29, 1976, by Joseph B. Kelly and assigned to the assignee of the present invention, PPG Industries, Inc. However, bending a rabbeted glass sheet to the desired curvature is an additional problem for which there was no solution in the prior art. Difficulty in bending such a rabbeted glass sheet arises from the fact that when the sheet is heated to a temperature suitable for bending, the rabbeted edge portions, being of reduced thickness, become softer and easier to bend than the main body of the glass sheet. Thus, when conventional bending techniques are employed, the softened thin rabbeted portions are bent too quickly or too sharply to permit adequate control of the final shape. In gravity sag bending, where a peripheral shaping rail is used to support the glass, the rabbeted edges become too soft to support the weight of the glass sheet on the rail. If the glass is supported inwardly from the rabbeted portion, the unsupported rabbeted portion then droops in the wrong direction. Press bending offers little improvement since the press faces cannot be brought to bear against opposite sides of the thin rabbeted portions, and therefore the curvature in the rabbeted portions cannot be positively effected. Attempts to provide the press face with a stepped contour to match the contour of the rabbeted glass have been found to be unsatisfactory. While the correct shape could be imparted to the glass sheets, including the rabbeted edge portions, it was found that cracks were formed along the edges of the sheets which seriously reduced their strength. It has now been theorized that this problem is caused during the initial moments of contact between the glass and the press face, at which time only the edge portions of the glass contact the female press face. Because the rabbeted portion is soft and easily bent, this initial contact causes the rabbeted portion to become severely bent temporarily. As the press members close, the severity of the bend at the edges is reduced as the center portion of the glass begins to bend. It is believed that this severe initial bending action in the rabbeted areas sets up undesirable stress patterns in that portion of the glass which cause weakening of the edges.

SUMMARY OF THE INVENTION

It has now been discovered that glass sheets having rabbeted edges can be successfully bent in a press bending operation if the rabbeted portions of the sheets are brought to bear against a slightly compressible filler strip affixed to the press face during the pressing operation. The filler strip outlines substantially the entire shape of the glass sheets and is aligned on the press so as to fall within the notched-out portion of the rabbeted sheets and is provided with a thickness substantially the same as the depth of the rabbet notch. The filler strip therefore approximately takes the place of the ground-out glass during pressing so as to support the reduced thickness portion of the sheet.

It is important that the filler strip be slightly compressible in order to avoid the edge-weakening defects discussed above which are encountered when a rigid material (such as metal) is used for the filler strip. Although the invention is not bound to any particular theory, it is believed that a compressible filler strip permits the edge of the glass sheet to be depressed into the filler strip when contact is first made with the press, thereby reducing the tendency of the rabbeted edge portion of the sheet to be excessively bent in the initial moments of the pressing operation. As the bending progresses and the pressing force becomes distributed over a wider area of the glass sheet, the amount of force on the edges of the glass sheet is reduced and the edges will no longer be depressed into the filler strip.

THE DRAWINGS

DETAILED DESCRIPTION

Cutting rabbets into the edges of glass sheets is not part of the present invention itself. Details of the rabbeting technique may be found in the aforesaid application Ser. No. 745,705 of Kelly, the disclosure of which is hereby incorporated by reference.

Likewise the details of the press bending operation need not be set forth in detail here, since that tecnique of shaping glass sheets is widely employed commercially and is well known to those of skill in the art. A particularly advantageous press bending arrangement is that disclosed in U.S. Pat. No. 3,367,764 to S. L. Seymour, the disclosure of which is hereby incorporated by reference. Although the present invention can be practiced with any type of press bending, the preferred embodiment will be described in connection with the specific arrangement of the Seymour patent, where the glass sheets are hung from tongs in a generally horizontal plane as they are conveyed into pressing position between two substantially horizontally reciprocated press members. Other press bending arrangements, with which the present invention may be practiced, may orient the glass horizontally or even obliquely in the pressing station.

Figure 1:
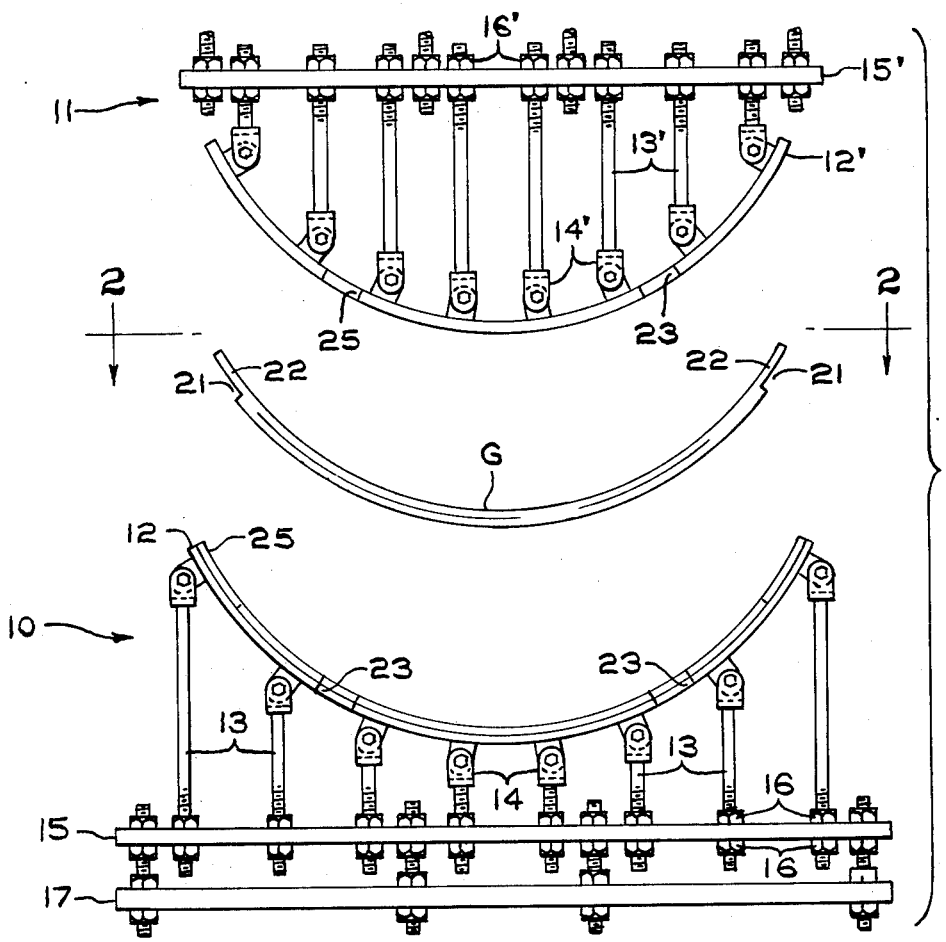
FIG. 1 is a top view of a portion of a typical press bending apparatus incorporating the filler strips of the present invention, showing a bent glass sheet about to be conveyed from the pressing position after beng bent.

Referring now to FIG. 1, there is shown from the top a female press 10 and an opposing male press 11, with a bent sheet of glass G therebetween. Female press 10 is comprised of a relatively flexible concave shaping plate 12 which has been bent to the curvature desired for the glass sheets. Plate 12 may be made of metal of sufficient rigidity to resist deforming during pressurized engagement with heat-softened sheets of glass. The curvature on shaping plate 12 is adjustably maintained by rods 13, each pivotably connected at one end by means of a clevis arrangement 14 to the back of shaping plate 12 and at the other end to a relativey rigid adjusting plate 15 by bolts 16 threaded onto the end of each rod. The adjusting plate 15 is stiffened by attachment to a back plate 17. The male press is constructed in like manner with a convex shaping plate 12' of complementary curvature to the female shaping plate, adjustable connections to an adjusting plate 15' including a plurality of rods 13', clevises 14', and bolts 16', and a back plate (not shown). The back plate of each press half is affixed to means (not shown) for reciprocating the press halves toward one another in a generally horizontal directon. It has been found advantageous in some cases to move the presses toward one another with a slight upward component of travel so as to reduce the pull of tongs on the glass sheets.

Each of the press faces may be covered with a material which protects the heat-softened glass sheets from being marked by contact with the pressing surface. This cover may be stretchable fiber glass cloth made of texturized yarn of the type disclosed in U.S. Pat. No. 3,148,968 to Cypher and Valchar. A cover has not been shown in the drawings so as not to obscure the press structure. Such a cover could be fastened to a press by clamping around the edges of plate 15 or 17.

Figure 2:
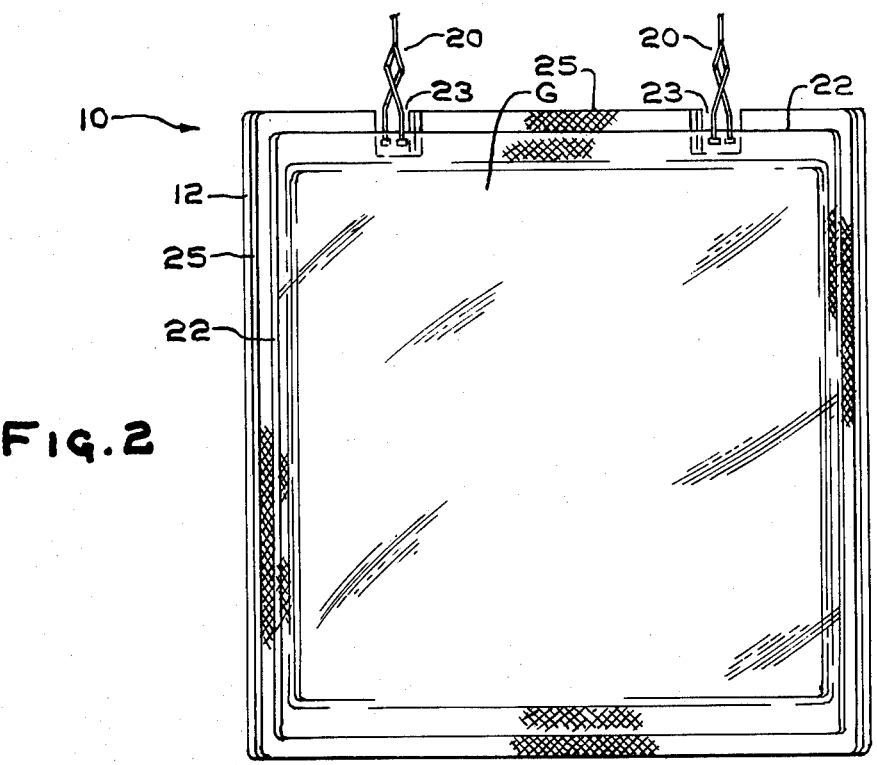
FIG. 2 is a horizontal view of the apparatus of FIG. 1 taken along line 2—2 of FIG. 1.

FIG. 2 shows a side view of a rabbeted sheet of glass G hung from a pair of tongs 20 in alignment with the female shaping plate 12. Both shaping plates 12 and 12' are provided with notches 23 within which the tongs are received when the presses close. The glass sheet shown has been rabbeted prior to bending around its entire perimeter, leaving a notch 21 around the edge of the glass sheet and a marginal portion 22 of the sheet with reduced thickness. The glass sheet is depicted as being rectangular, but it should be understood that the shape may also be curved, including circular or eliptical. It should also be noted that the curvature of the bend shown being produced is a cylindrical section, but the compound bends having radii of curvature in two directions may be produced by press bending.

Adhered to the glass-facing surface of the female shaping plate 12 is a filler strip 25 having approximatey the same thickness as the rabbet notch 21. The filler strip should be located só as to underlie most of the thin marginal area 22 of the glass sheet. FIG. 2 shows the filler strip 25 extending continuously around the perimeter of glass sheet except for cut-out portions at the tong notches 23, but minor gaps may be tolerated. Moreover, the filler strip need not conform exactly to the area underlying the rabbeted portion of the glass sheet, but preferaby circumscribes an area slightly wider than necessary so that aligning a glass sheet with the filler strip is easier and so that the glass sheet does not bind in the recess formed by the filler strip. As a specific example, when bending a glass sheet having a 0.75 inch (19 millimeters) wide abbet, a clearance of 0.25 inch (6.4 millimeters) was provided between each portion of the inner edge of the filler strip 25 and the inner edge of the rabbet notch 21. The filler strip was 1.25 inches (3.2 centimeters)wide, and thus the outer edge of the filler strip was well outside the outer edges of the glass sheet.

The filler strip 25 must be slightly compressible in order to successfully bend rabbeted glass sheets. Its compressibility should be soft enough that the initial pressing force on the edges of the glass will cause the edge of the glass sheet to compress the strip, but stiff enough that the strip can cover near the end of the bending action to offer substantial support to the thin marginal portion 22 of the glass sheet. The filler strip should also be able to withstand a fairly high temprature environment generated by intermittent contact with glass sheets at about 1200° F. (650° C). The temperature of the shaping plate under such conditions typically rises to about 400° F. (200° C.) to 600° F. (320° F.). An example of a specific material which has been found suitable is sold under the name "Ferrous Asbestos 6-630" (commercial grade) by the American Textile co., and is a fabric-like material coarsely woven from strands having a fine wire core and incorporating asbestos fiber and apparently another fiber such as cotton. This product has the appearance of a flexible, braided ribbon one sixteenth of an inch (1.6 millimeters) thick and 1.25 inches (3.2 centimeters) wide. Any similarly heat-resistant and slightly compressible material may serve as the filler strip.

Filler strip 25 may be affixed to the glass-facing surface of shaping plate 12 by any suitable means, but the most convenient way is to use adhesive or adhesive tape. The filler strip may be held in place by a double backed adhesive tape such as "3M" brand number "4416" made by Minnesota Mining and Manufacturing Co., although its tendency to soften in the hot environment may render it less preferable in some cases. The contact cement type of adhesives may also be used and appear to offer better thermal stability. The combined thickness of the filler strip and the tape or adhesive should approximate the depth of the rabbet notch 21. For example a filler strip of one sixteenth inch (1.6 millimeters) thick "Ferrous Asbestos" together with a one sixteenth inch thick adhesive tape or layer of contact cement may be used successfully with a rabbet ⅛ inch (3.2 millimeters) deep.

Other variations and modifications as are known to those of skill in the art may be resorted to without departing from the spirit and scope of the invention as defined by the appended claims.

I claim:

1. A method of shaping a glass sheet having rabbeted edges, comprising: heating said glass sheet to a heat-softened condition suitable for bending, positioning the heat-softened glass sheet between opposed pairs of press bending members having shaping surfaces which face the glass sheet and are of complementary convex and concave curvature corresponding to the desired curvature for the glass sheets, moving said shaping surfaces together to apply bending fordes to the heat-softened glass sheet, wherein the initial bending force applied to the rabbeted marginal edge portions of the glass sheet is thourgh a compressible filler strip on the concave shaping surface aligned with the rabbeted marginal edge portions of the glass sheet, so that edge portions of the glass sheet initially compress the filler strip and thereby substantially avoid over-bending the rabbeted marginal edge portions of the glass sheet, continuing bringing the shaping surfaces together until brought ot bear against substantially all of the non-rabbeted portions of the glass sheet and said filler strip fills a substantial portion of the rabbet in the glass sheet, separating the shaping surfaces, an conveying the bent glass sheet from between the shaping surfaces.

2. An apparatus for press bending heat-softened glass sheets having rabbeted edges, comprising: a pair of opposed glass-facing shaping surfaces of complementary convex and concave curvatues corresponding to the desired curvature for the glass sheets, said shaping surfaces having sufficient rigidity to resist deformation during pressurized engagement with a heat-softened glass sheet, a compressible filler strip affixed to the concave shaping surface in a configuration adapted to fall into alignment with the rabbeted marginal edge portions of the glass sheets, said filler strip having sufficient compressibility to be slightly compressed by initial bending force exerted through edge portions of the glass sheets and having sufficient firmness to support the rabbeted marginal edge portions of the glass sheets in the final stage of bending, and means for moving said shaping surfaces into a glass engaging position and a retracted position.

3. The apparatus of claim 2 wherein said filler strip is a heat-resistant woven material.

4. The apparatus of claim 3 wherein said woven material includes fine metal filaments and asbestos fiber.

* * * * *